US008175569B2

(12) United States Patent
Yoshida

(10) Patent No.: US 8,175,569 B2
(45) Date of Patent: May 8, 2012

(54) DEVICE CONTROL

(75) Inventor: Yukinori Yoshida, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 1162 days.

(21) Appl. No.: 11/287,383

(22) Filed: Nov. 28, 2005

(65) Prior Publication Data

US 2006/0121863 A1 Jun. 8, 2006

(30) Foreign Application Priority Data

Dec. 3, 2004 (JP) ................................ 2004-351379

(51) Int. Cl.
*H04B 1/06* (2006.01)

(52) U.S. Cl. ..................... 455/352; 455/151.2; 348/734; 340/4.11; 340/426.13

(58) Field of Classification Search .................. 455/420, 455/41.1–41.3, 130, 151.2, 352; 381/86; 348/734; 236/51; 340/517, 4.11, 426.13
See application file for complete search history.

(56) References Cited

U.S. PATENT DOCUMENTS 4,571,586 A * 2/1986 Right ............................ 340/517
4,633,514 A * 12/1986 Fimoff et al. .............. 455/151.2
4,751,581 A * 6/1988 Ishiguro et al. ............... 348/734
5,109,420 A * 4/1992 Nonaka ........................... 381/86
5,513,796 A * 5/1996 Matsumoto et al. ............ 236/51
5,752,184 A * 5/1998 Ishimura ....................... 455/352
7,237,029 B2 * 6/2007 Hino et al. .................... 709/227
2005/0191999 A1 * 9/2005 Tezuka .......................... 455/420

FOREIGN PATENT DOCUMENTS

JP 60-153237 8/1985
JP 7-288876 10/1995
JP 2003-125463 4/2003
JP 2003125463 A * 4/2003

OTHER PUBLICATIONS

Japanese Office Action dated Mar. 18, 2008 with Partial English Translation.

* cited by examiner

*Primary Examiner* — Junpeng Chen
(74) *Attorney, Agent, or Firm* — McGinn Intellectual Property Law Group, PLLC

(57) ABSTRACT

A device control is disclosed for controlling a device with a high-priority signal without interference by a low-priority signal. Panel keys, which serve as a high-priority signal receiver unit, receives a high-priority signal. A panel key signal processing unit, which is a high-priority signal processing unit, processes the signal received by the panel keys. A remote control signal receiver unit, which is a low-priority signal receiver unit, receives a low-priority signal. A remote control signal processing unit, which is a low-priority signal processing unit, processes the signal received by the remote control signal receiver unit. A remote control signal reception control unit, which is a low-priority signal processing control unit, disables the processing in the remote control signal processing unit when the panel key signal processing unit is performing the processing.

5 Claims, 7 Drawing Sheets

DEVICE CONTROL

BACKGROUND OF THE INVENTION

1. Field of the Invention

The present invention relates to a device control apparatus and a device control method for controlling devices using a plurality of control means.

2. Description of the Related Art

Conventionally, a user may control a device using a plurality of control means which include a control means that permits the user to remotely operate the device with a remote controller, other than a control means that permits the user to operate the device through mechanisms such as panel keys provided thereon.

When a device is controlled by a plurality of remote controllers, a conflict in managing control arises because the device is operated by a plurality of remote controllers. In recent years, some methods have been developed for avoiding this kind of conflict by explicitly prohibiting some remote controllers from having a reception function, or by identifying a remote controller as the priority remote controller on the device side from among several remote controllers which have been assigned their respective identifiers. Also, JP-A-1995-288876 discloses a control method which allows only a remote controller that has been used to turn off of a device to be used when the device is turned on the next time.

To illustrate, assume that a control means, which responds to manipulations on panel keys, for example, is given a higher priority than a control means which responds to manipulations on a remote controller in a situation where a plurality of identical devices exist in the neighborhood. In this event, if one user attempts to control one of the devices by manipulating the remote controller while another user is controlling another device by manipulating the panel keys, the remote control signal transmitted from the remote controller manipulated by this user will affect all the identical devices in the neighborhood. Consequently, a problem arises that the remote control signal of one user prevents the activity of another user who is manipulating the panel keys.

To give another illustration, assume, for example, that two devices are turned off by the same remote controller, and one of the devices that has been turned off by the remote controller is controlled by manipulating the panel keys. In the method disclosed in the aforementioned patent document, even in the above state, if another device is operated by the remote controller, the device controlled by manipulating the panel keys will be affected by the remote controller which is operating the other device. Consequently, a problem arises in that the user who uses the remote controller will prevent the panel key operations of the user who is manipulating the panel keys from having any effect.

SUMMARY OF THE INVENTION

It is an object of the present invention to provide a device control apparatus and a device control method which are capable of readily controlling a device by using a high-priority control signal which will not be affected by a low-priority control signal.

In the present invention, when a low-priority control signal is received while processing is being performed in accordance with a high-priority control signal, a determination is made whether or not the low-priority control signal meets a condition in accordance with the low-priority signal enabling condition determining means. When it is determined that the condition is met, processing in accordance with the low-priority control signal is disabled.

Thus, it is possible to avoid an erroneous operation that would be caused by a conflict in processing between a high-priority control signal and a low-priority control signal. Also, since the processing is automatically enabled or disabled, the user does not need to do complicated settings, nor to explicitly prohibit a signal receiving operation.

The above and other objects, features and advantages of the present invention will become apparent from the following description with reference to the accompanying drawings which illustrate examples of the present invention.

DETAILED DESCRIPTION OF THE PREFERRED EMBODIMENTS (First Embodiment)

Figure 1:
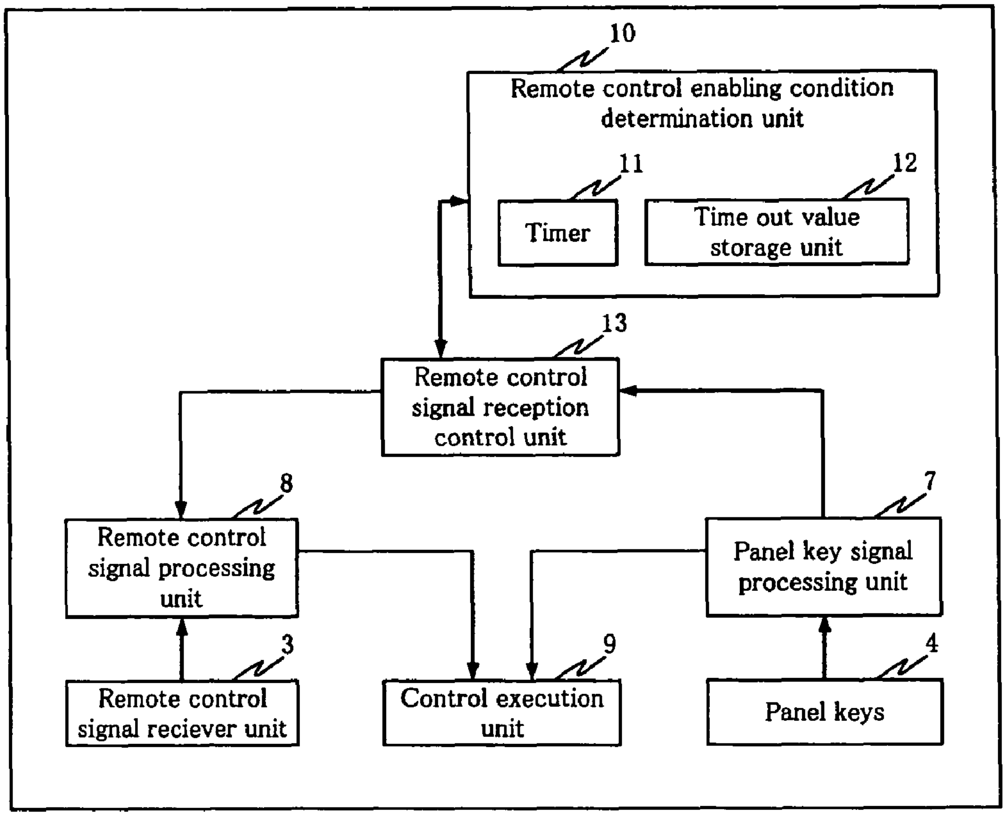
FIG. 1 is a diagram illustrating a first embodiment of a device control apparatus according to the present invention.

Referring to FIG. 1, there is illustrated a device control apparatus which comprises panel keys 4, panel key signal processing unit 7, remote control signal receiver unit 3, remote control signal processing unit 8, control execution unit 9, remote control enabling condition determination unit 10, and remote control signal reception control unit 13. Panel keys 4, which are directly manipulated by the user, serve as a high-priority signal receiver unit for receiving a control signal which is processed with a higher priority. Panel key signal processing unit 7 serves as a high-priority signal processing unit for processing a signal entered from panel keys 4. Remote control signal receiver unit 3 is a low-priority signal receiver unit which receives a signal transmitted from a remote controller as a low-priority control signal when the user manipulates the remote controller to control a device. Remote control signal processing unit 8 is a low-priority signal processing unit for processing a signal received in remote control signal receiver unit 3. Control execution unit 9 controls an associated device based on the result of processing that occurs in panel signal processing unit 7 and remote control signal processing unit 8. Remote control enabling condition determination unit 10 is a low-priority signal enabling condition determination unit for determining conditions for enabling or disabling a remote control signal. Remote control signal reception control unit 13 is a low-priority signal processing control unit which determines whether a remote control signal is enabled or disabled based on the result of determination made by remote control enabling condition determination unit 10, and instructs whether or not a remote control signal received by remote control signal receiver unit 3 should be processed by remote control signal processing unit 8.

Remote control enabling condition determination unit 10 comprises timer 11 and time out value storage unit 12. Timer 11 measures the time. Time-out value storage unit 12 holds a time out value based on which timer 11 times out.

Next, a method of controlling devices will be described with reference to FIGS. 2 and 3.

Figure 2:
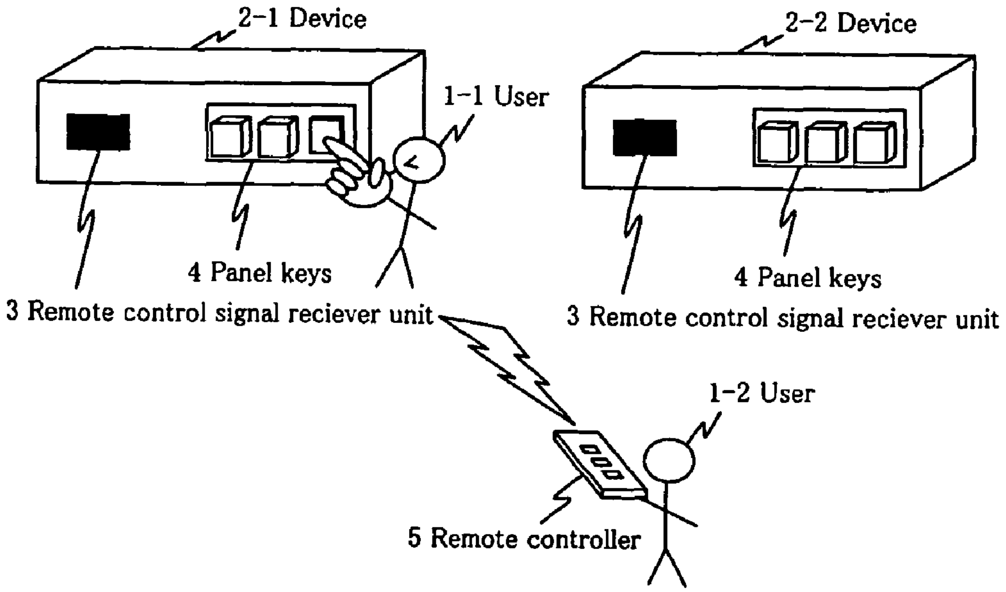
FIG. 2 is a diagram describing a method of controlling a device shown in FIG. 1.
Figure 3:
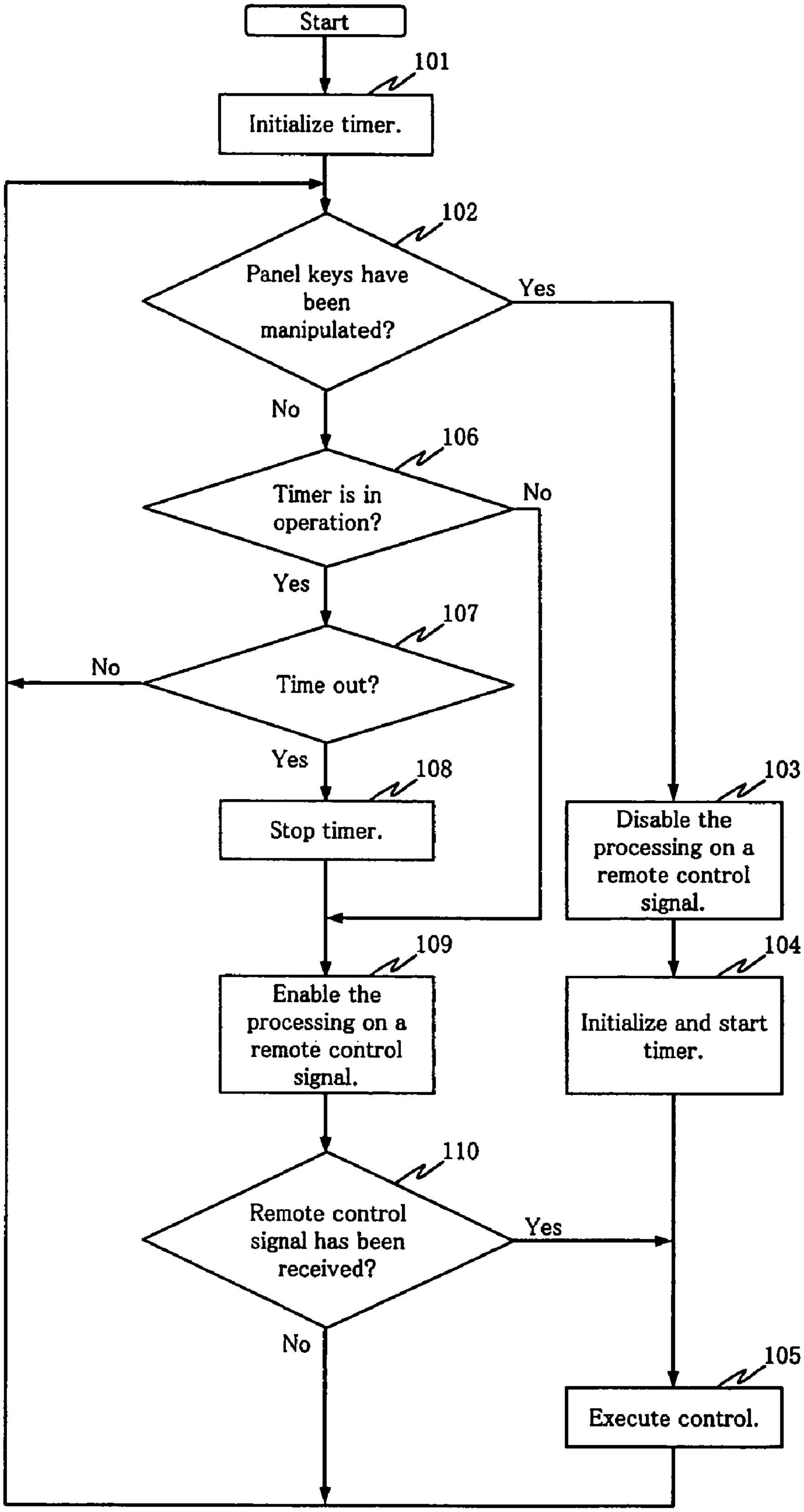
FIG. 3 is a flow chart describing the method of controlling the device shown in FIG. 1.

As illustrated in FIG. 2, user 1-1 is attempting to control device 2-1, which is shown in the configuration illustrated in FIG. 1, through panel keys 4. Simultaneously with this, user 1-2 is attempting to remotely control device 2-2, which is shown in the configuration illustrated in FIG. 1, using remote controller 5.

First, at step 101, timer 11 is initialized in remote control enabling condition determination unit 10. Here, timer 11 may be initialized automatically when device 2-1 is started. Alternatively, timer 11 may be initialized in response to a command from remote control signal reception control unit 13.

Next, at step 102, panel key signal processing unit 7 determines whether or not panel keys 4 have been manipulated by user 1-1. Then, the result of the determination is delivered from panel key signal processing unit 7 to remote control signal reception control unit 13.

When it is determined that panel keys 4 have been manipulated by user 1-1, remote control signal reception control unit 13 instructs remote control signal processing unit 8 to disable processing of a remote control signal at step 103.

Then, at step 104, timer 11 is initialized and started. The initialization and start of timer 11 at step 104 are controlled by remote control signal reception control unit 13.

After timer 11 has been started, control execution unit 9 executes control based on a signal processed in panel key signal processing unit 7 at step 105.

On the other hand, when it is determined at step 102 that panel keys 4 have not been manipulated by user 1-1, remote control signal reception control unit 13 determines at step 106 whether or not timer 11 is in operation.

Upon determining that timer 11 is in operation, remote control signal reception control unit 13 determines at step 107 whether or not a current value of timer 11 is larger than a time-out value stored in time-out value storage unit 12. The time-out value stored in time-out value storage unit 12 has been set beforehand.

When it is determined that the current value of timer 11 is not larger than the time-out value stored in time-out value storage unit 12, the flow sequence returns to processing at step 102.

Conversely, upon determining that the current value of timer 11 is larger than the time-out value stored in time-out value storage unit 12, remote control signal reception control unit 13 stops timer 11 at step 108. Then, at step 109, remote control signal reception control unit 13 instructs remote control signal processing unit 8 to enable processing of a remote control signal.

On the other hand, when it is determined that timer 11 is stopped at step 106, processing at steps 107, 108 is skipped, then processing at step 109 is executed.

Subsequently, remote control signal processing unit 8, which has been instructed to enable processing on a remote control signal, determines at step 110 whether or not a remote control signal has been received by remote control signal receiver unit 3. Then, upon determining that a remote control signal has been received by remote control signal receiver unit 3, remote control signal processing unit 8 processes the received remote control signal. Subsequently, control execution unit 9 executes control based on the processed signal that occurs at step 105.

Conversely, when it is determined that no remote control signal has been received by remote control signal receiver unit 3, the flow sequence returns to processing at step 102.

(Second Embodiment)

The first embodiment provides timer 11 such that manipulations from remote controller 5 are disabled for a certain time from the time user 1-1 first manipulates panel keys 4. On the other hand, a second embodiment provides each of panel keys 4 and remote controller 5 with a menu key such that manipulations from remote controller 5 are disabled when a menu screen is displayed on a display screen arranged on device 2-1 through a manipulation on the menu key of panel keys 4.

Figure 4:
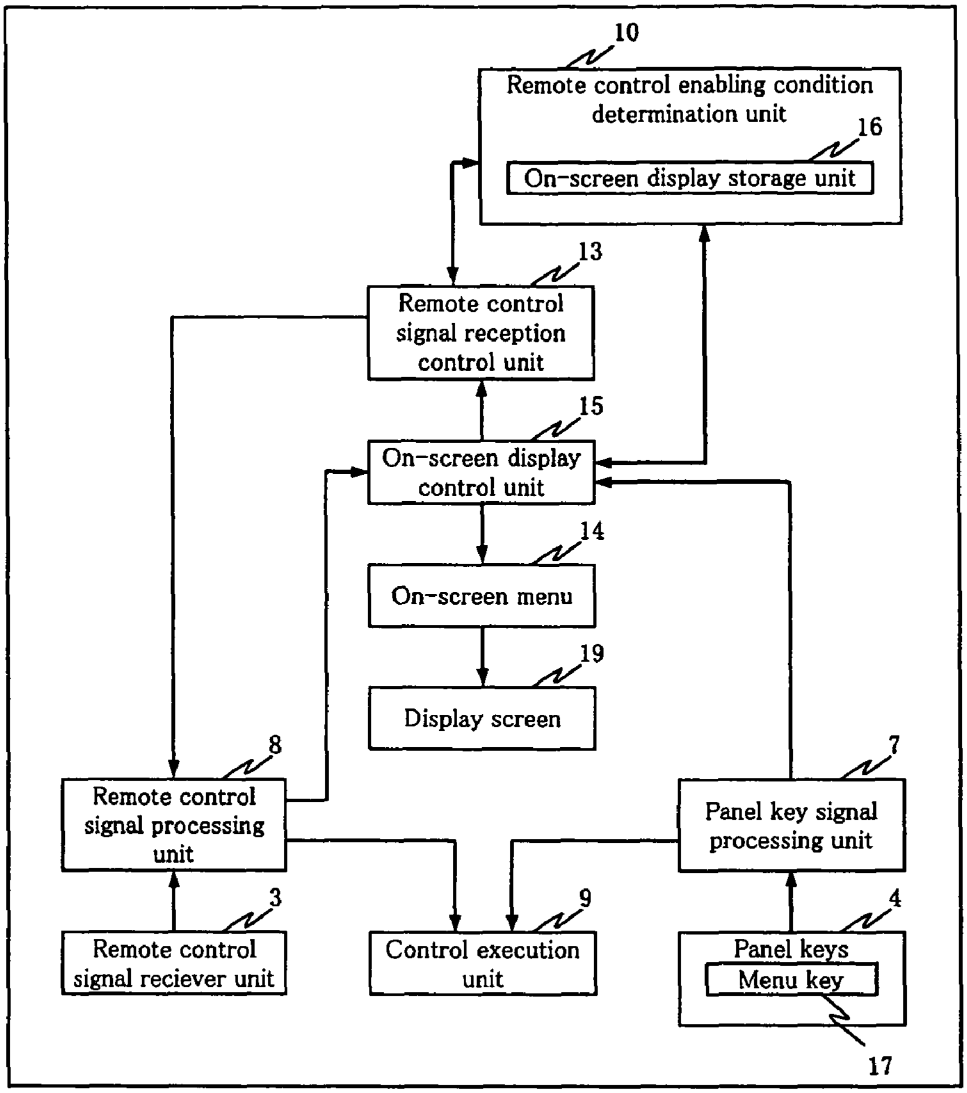
FIG. 4 is a diagram illustrating a second embodiment of the device control apparatus according to the present invention.

Referring to FIG. 4, there is illustrated a device control apparatus which comprises panel keys 4, panel key signal processing unit 7, remote control signal receiver unit 3, remote control signal processing unit 8, control execution unit 9, remote control enabling condition determination unit 10, remote control signal reception control unit 13, on-screen display control unit 15, on-screen menu 14, and display screen 19. Panel keys 4 are directly manipulated by user 1-1 to receive a high-priority control signal. Panel key signal processing unit 7 processes a signal entered from panel keys 4. Remote control signal receiver unit 3 receives a signal transmitted from a remote controller as a low-priority control signal when the user manipulates the remote controller to control the apparatus. Remote control signal processing unit 8 processes a signal received in remote control signal receiver unit 3. Control execution unit 9 controls an associated device based on the result of processing performed by panel key signal processing unit 7 or remote control signal processing unit 8. Remote control enabling condition determination unit 10 determines the condition for enabling or disabling a remote control signal. Remote control signal reception control unit 13 determines whether a remote control signal is enabled or disabled based on the result of the determination made by remote control enabling condition determination unit 10, and instructs whether or not a remote control signal received by remote control signal receiver unit 3 will be processed by remote control signal processing unit 8. On-screen display control unit 15 is a screen display control unit which receives instructions through panel keys 4 or remote controller to control the display or erasure of the menu screen. On-screen menu 14 is a menu displayed by on-screen display control unit 15. On-screen menu 14 is displayed on display screen 19.

Panel keys 4 also include menu key 17. Menu key 17 is a key for displaying on-screen menu 14 on display screen 19.

Remote control enabling condition determination unit 10 also includes on-screen display storage unit 16. On-screen display storage unit 16 is a screen display storage unit which stores the contents of on-screen menu 14 displayed on display screen 19 by manipulation of menu key 17.

Next, a method of controlling devices will be described with reference to FIGS. 5 and 6.

Figure 5:
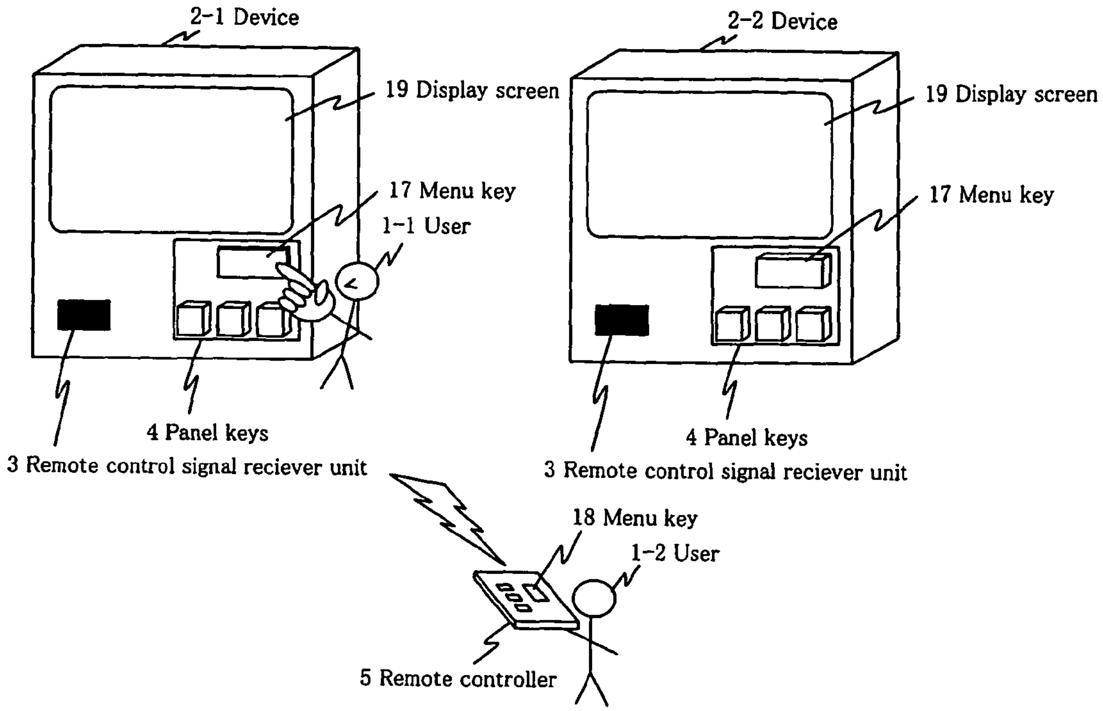
FIG. 5 is a diagram describing a method of controlling a device shown in FIG. 4.

As illustrated in FIG. 5, user 1-1 is attempting to control device 2-1, which is shown in the configuration illustrated in FIG. 4, through panel keys 4. Simultaneously with this, user 1-2 is attempting to control device 2-2, which is shown in the configuration illustrated in FIG. 4, by manipulating remote controller 5.

First, at step 121, on-screen display control unit 15 erases on-screen menu 14 that is displayed on display screen 19. In response, the contents stored in on-screen menu storage unit 16 are initialized to read “on-screen menu not displayed” at step 122.

Next, panel key signal processing unit 7 determines at step 123 whether or not user 1-1 has manipulated panel keys 4.

Then, the result of the determination is delivered from panel key signal processing unit 7 to on-screen display control unit 15, and then delivered from on-screen display control unit 15 to remote control signal reception control unit 13.

Upon determining that user 1-1 has manipulated panel keys 4, panel key signal processing unit 7 determines at step 124 whether or not a manipulated key is menu key 17.

When it is determined that the manipulated key is menu key 17, the means to control the display menu, which appears on the screen, is provided at step 125. Subsequently, at step 126, control execution unit 9 executes control based on the signal processed by panel key signal processing unit 7.

Conversely, when it is determined that the manipulated key is not menu key 17, the means to control the display menu, which appears on the screen, is not provided at step 125, but the control at step 126 is executed.

On the other hand, when it is determined at step 123 that user 1-1 has not manipulated panel keys 4, remote control signal reception control unit 13 determines at step 127 whether or not on-screen display storage unit 16, within remote control enabling condition determination unit 10, contains the contents of on-screen menu 14 displayed on display screen 19 by manipulating menu key 17. When it is determined that on-screen display storage unit 16 contains the contents of on-screen menu 14, the flow sequence returns to processing at step 123.

Conversely, upon determining that on-screen display storage unit 16 does not contain the contents of on-screen menu 14, remote control signal reception control unit 13 instructs remote control signal processing unit 8 to enable processing a remote control signal at step 128.

Subsequently, at step 129, remote control signal processing unit 8, which has been instructed to enable processing, determines whether or not a remote control signal has been received by remote control signal receiver unit 3. Upon determining that a remote control signal has been received by remote control signal receiver unit 3, remote control signal processing unit 8 determines at step 124 whether or not the received remote control signal results from manipulating menu key 18.

Here, when it is determined that the received remote control signal results from manipulating menu key 18, the means to control the display menu, which appears on the screen, is provided at step 125. Subsequently, at step 126, control execution unit 9 executes control based on the signal processed by remote control signal processing unit 8.

Conversely, when it is determined that the received remote control signal does not result from manipulating menu key 18, the menu display control is not conducted at step 125, but the control at step 126 is executed.

On the other hand, when it is determined at step 129 that no remote control signal has been received by remote control signal reception unit 3, the flow sequence returns to step 123.

Figure 7:
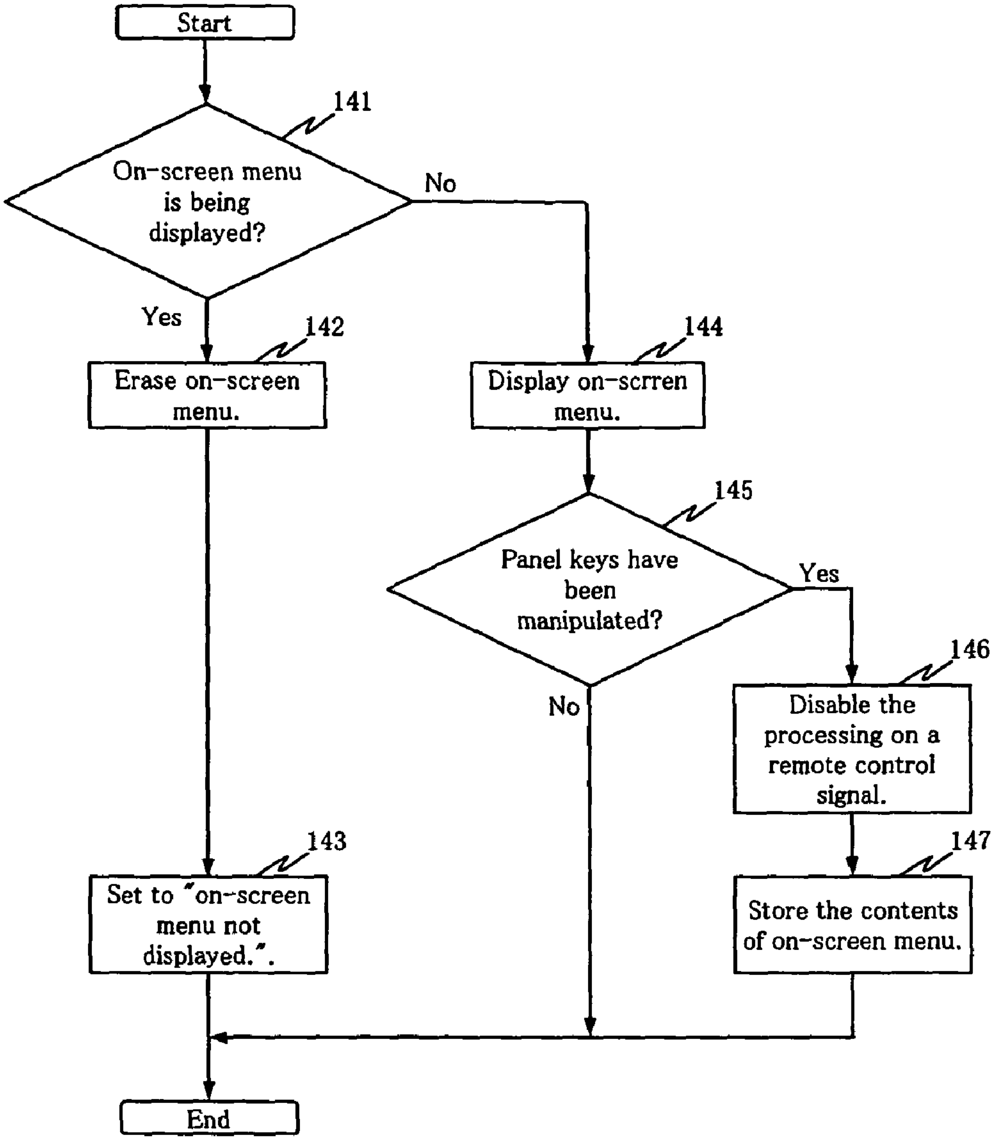
FIG. 7 is a flow chart describing a menu display control in the device control apparatus illustrated in FIG. 4 and the control method illustrated in FIG. 5.

Next, details on processing involved in the menu display control at step 125 will be described with reference to FIG. 7.

At step 141, on-screen display control unit 15 determines whether or not on-screen menu 14 is currently being displayed on display screen 19. Upon determining that on-screen menu 14 is being displayed, on-screen display control unit 15 erases on-screen menu 14 from display screen 19 at step 142.

Subsequently, at step 143, on-screen display control unit 15 sets the contents of on-screen display storage unit 16 to read "on-screen menu not displayed."

On the other hand, upon determining that on-screen menu 14 is not being displayed on display screen 19, on-screen display control unit 15 displays on-screen menu 14 on display screen 19 at step 144.

Figure 6:
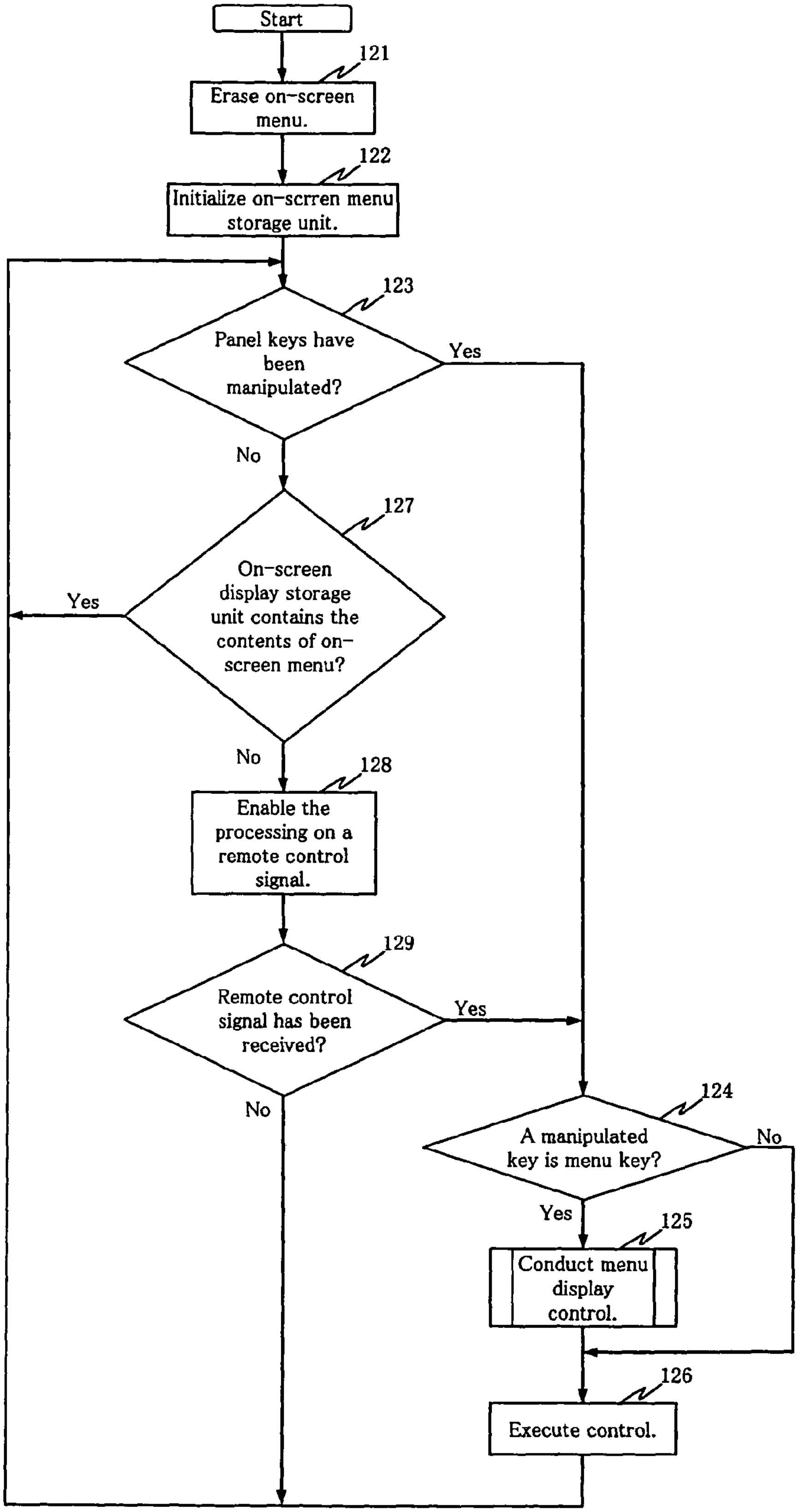
FIG. 6 is a flow chart describing a method of controlling the device shown in FIG. 4.

Next, at step 145, remote control signal reception control unit 13 recognizes whether or not user 1-1 has manipulated panel keys 4 based on the result determined at step 123 shown in FIG. 6 and delivered to remote control signal reception control unit 13.

Upon recognizing that user 1-1 has manipulated panel keys 4, remote control signal reception control unit 13 instructs remote control signal processing unit 8 to disable processing of a remote control signal at step 146.

Subsequently, at step 147, the contents of on-screen menu 14 that are displayed on display screen 19, by the user manipulating menu key 17, are stored by on-screen display control unit 15.

Conversely, upon recognizing at step 145 that user 1-1 has not manipulated panel key 4, remote control signal reception control unit 13 does not perform any operation.

The foregoing first and second embodiments have been described, giving an example in which a signal entered through panel keys 4 is given a higher priority, and a signal transmitted from remote controller 5 is given a lower priority. The present invention, however, is not limited to the combination of a high-priority signal and a low-priority signal as exemplified in the first and second embodiments. In other words, any signals received for purposes of controlling the apparatus can be combined and arbitrarily given respective priorities.

For example, a signal transmitted from another device connected to the apparatus through a serial interface (hereinafter called the "serial signal") can be given a higher priority, while a signal transmitted from another device connected to the apparatus through a network (hereinafter called the "network signal") can be given a lower priority, for use in controlling the apparatus. In this event, panel keys 4 shown in FIGS. 1 and 4 serve as a high-priority signal receiver unit for receiving the serial signal. Panel key signal processing unit 7 shown in FIGS. 1 and 4 serves as a high-priority signal processing unit for processing the serial signal. Remote control signal receiver unit 3 shown in FIGS. 1 and 4 serves as a low-priority signal receiver unit for receiving the network signal. Remote control signal processing unit 8 shown in FIGS. 1 and 4 serves as a low-priority signal processing unit for processing the network signal. Remote control enabling condition determination unit 10 shown in FIGS. 1 and 4 serves as a low-priority signal enabling condition determination unit for determining conditions for enabling or disabling the network signal. Remote control signal reception control unit 13 shown in FIGS. 1 and 4 serves as a low-priority signal processing control unit for determining whether the network signal is enabled or disabled, based on the result of the determination made by remote control enabling condition determination unit 10, to instruct remote control signal processing unit 8 whether or not to process the network signal received by remote control signal receiver unit 3.

While preferred embodiments of the present invention have been described using specific terms, such description is for illustrative purposes only, and it is to be understood that changes and variations may be made without departing from the spirit or scope of the following claims.

What is claimed is:

1. A device control apparatus, comprising:

a high-priority signal receiver unit for receiving a control signal having a higher priority status;

a high-priority signal processing unit for processing the control signal received by said high-priority signal receiver unit;

a low-priority signal receiver unit for receiving a control signal having a lower priority status;

a low-priority signal processing unit for processing the control signal received by said low-priority signal receiver unit;

a low-priority signal enabling condition determination unit for determining a condition for enabling or disabling processing of the control signal received by said low-priority signal receiver unit in said low-priority signal processing unit;

a low-priority signal processing control unit for instructing said low-priority signal processing unit to enable or disable the processing of the control signal received by said low-priority signal receiver unit based on a result of a determination made in said low-priority signal enabling condition determination unit; and a screen display control unit for controlling a display of a control menu on a display screen, wherein said low-priority signal enabling condition determination unit includes:

a timer for measuring a time; and a time-out value storage unit for holding a time-out value, based on which said timer times out, wherein said low-priority signal processing control unit instructs said low-priority signal processing unit to disable processing of the control signal received by said low-priority signal receiver unit from a time that control signal is received by said high-priority signal receiver unit to a time, measured by said timer, that exceeds the time-out value held in said time-out value storage unit, wherein said low-priority signal processing control unit instructs said low-priority signal processing unit to disable processing of the control signal being received by said low-priority signal processing unit from said low-priority signal receiver unit while said control menu is displayed on said display screen, and wherein the control menu is configured to inform a user that the low-priority signal is disabled while the control menu is displayed on the display screen such that the user can recognize a period of time that the low-priority signal is disabled and to allow the user, who is trying to send a low-priority signal, to visually realize that the low-priority signal is disabled.

2. The device control apparatus according to claim 1, wherein said timer is initialized when a device associated with the high-priority signal receiver unit is started.

3. The device control apparatus according to claim 1, wherein said timer is initialized when the control signal having a higher priority status is received.

4. A method of controlling a device using a received high-priority control signal and a received low-priority control signal, said method comprising:

determining whether a processing of a received signal in accordance with the low-priority control signal is enabled or disabled based on a reception of the high-priority control signal;

enabling or disabling processing of the received signal in accordance with the low-priority control signal based on a result of the determination;

disabling processing of the received signal in accordance with the low-priority control signal for a predetermined time from a time of reception of the high-priority control signal;

disabling processing of the received signal in accordance with the low-priority control signal while a control menu displayed by the high-priority control signal is stored; and configuring the control menu to inform a user that the low-priority signal is disabled while the control menu is displayed such that the user can recognize a period of time that the low-priority signal is disabled and to allow the user, who is trying to send a low-priority signal, to visually realize that the low-priority signal is disabled.

5. The method according to claim 4, wherein the disabling processing of the received signal comprises disabling processing of the received signal while displaying said control menu on a display screen.

* * * * *